US012722916B2

(12) United States Patent
Roemen

(10) Patent No.: US 12,722,916 B2
(45) Date of Patent: Sep. 1, 2026

(54) APPARATUS AND SYSTEM FOR WELL SITE SAND STORAGE AND HANDLING

(71) Applicant: Wet Sand Solutions, LLC, Brookshire, TX (US)

(72) Inventor: Jacob Michael Roemen, Brookshire, TX (US)

( * ) Notice: Subject to any disclaimer, the term of this patent is extended or adjusted under 35 U.S.C. 154(b) by 69 days.

(21) Appl. No.: 18/934,290

(22) Filed: Nov. 1, 2024

(65) Prior Publication Data

US 2025/0058983 A1 Feb. 20, 2025

Related U.S. Application Data

(62) Division of application No. 18/301,097, filed on Apr. 14, 2023, now Pat. No. 12,258,229.

(51) Int. Cl.

*B65G 65/42* (2006.01)
*B62D 33/02* (2006.01)
*B65D 88/00* (2006.01)
*B65D 88/54* (2006.01)
*B65G 11/18* (2006.01)

(52) U.S. Cl.

CPC ........... *B65G 65/42* (2013.01); *B65D 88/005* (2013.01); *B65D 88/542* (2013.01); *B62D 33/02* (2013.01); *B65G 11/186* (2013.01); *B65G 2201/045* (2013.01)

(58) Field of Classification Search

CPC .... B62D 33/02; B65D 88/005; B65D 88/542; B65G 2201/045; B65G 11/186; B65G 65/42; B65G 3/04

See application file for complete search history.

(56) References Cited

U.S. PATENT DOCUMENTS

| | | | | |
|---|---|---|---|---|
| 4,995,522 | A * | 2/1991 | Barr | B65F 1/12 220/1.5 |
| 5,197,845 | A * | 3/1993 | Snead | B61D 7/32 105/157.1 |
| 8,585,341 | B1 * | 11/2013 | Oren | B65D 90/587 414/407 |
| 9,889,785 | B1 * | 2/2018 | Van Horn | G01G 13/18 |
| 10,279,989 | B2 * | 5/2019 | Sanders | B65D 88/32 |
| 10,464,741 | B2 * | 11/2019 | Oren | B65D 90/20 |
| 10,538,381 | B2 * | 1/2020 | Harris | B65D 90/0033 |
| 12,258,229 | B2 * | 3/2025 | Roemen | B65G 41/008 |
| 2018/0065814 | A1 * | 3/2018 | Eiden, III | B65D 88/32 |
| 2018/0127221 | A1 * | 5/2018 | Mintz | B60P 1/00 |
| 2018/0345998 | A1 * | 12/2018 | Reitz | B61D 7/20 |
| 2024/0327141 | A1 * | 10/2024 | Hagan | B65G 65/44 |

* cited by examiner

*Primary Examiner* — James R Bidwell

(74) *Attorney, Agent, or Firm* — Jeffrey L. Streets

(57) ABSTRACT

An apparatus is provided for improving sand storage at a well site, and a system and method are provided for using the apparatus. The apparatus, which may be referred to as a portable tunnel structure, include a hopper having a perimeter edge and surfaces that are sloped downward and inward to a plurality of hopper outlets, a conveyor system having a conveyor belt disposed below the plurality of hopper outlets, and a support framework including a horizontal base structure for supporting the support framework on a load bearing stratum, horizontal hopper reinforcement beams secured along the outer perimeter edge of the hopper, and outer vertical support beams extending between the horizontal base structure and the horizontal beams.

16 Claims, 8 Drawing Sheets

90
90
88
84
80
96
86
82
94
10
10
10
10
10
21
L
A
A
50
50
14
14
14
14
14
92
5W 10
20
50
14
95
98
45
12
84
86
96
5W
W
80

APPARATUS AND SYSTEM FOR WELL SITE SAND STORAGE AND HANDLING

CROSS-REFERENCE TO RELATED APPLICATIONS

This application is a divisional of U.S. Non-Provisional patent application Ser. No. 18/301,097 filed on Apr. 14, 2023, which is incorporated by reference herein.

BACKGROUND

The present disclosure relates to methods and apparatus for storing and handling sand at a work site, such as a well site.

BACKGROUND OF THE RELATED ART

Particulate materials, such as sand and small rocks, are used in a variety of work sites, such as construction sites and well sites. In some applications, the particulate materials may be dumped on the ground for storage prior to use. However, for other applications, such as hydraulic fracturing of a subterranean formation containing oil or gas, contamination of the sand must be avoided, and any sand spilled onto the ground must be remediated when the well has been completed.

BRIEF SUMMARY

Some embodiments provide an apparatus comprising a hopper having a perimeter edge and surfaces that are sloped downward and inward to a plurality of hopper outlets, a conveyor system having a conveyor belt disposed below the plurality of hopper outlets, and a support framework including a horizontal base structure for supporting the support framework on a load bearing stratum, horizontal hopper reinforcement beams secured along the outer perimeter edge of the hopper, and outer vertical support beams extending between the horizontal base structure and the horizontal beams.

Some embodiments provide a system comprising a plurality of portable tunnel structures positioned in a side-by-side configuration with no more than a minimal gap between adjacent portable tunnel structures. Each portable tunnel structure includes a hopper having a rectangular storage area, wherein the side-by-side configuration of the plurality of portable tunnel structures forms a collective storage area that is the sum of the rectangular storage areas of each portable tunnel structure. Each portable tunnel structure further includes a perimeter edge and surfaces that are sloped downward and inward to a plurality of hopper outlets, a conveyor system having a conveyor belt disposed below the plurality of hopper outlets, and a support framework. The support framework includes a horizontal base structure having flat surfaces for supporting the support framework on a load bearing stratum, horizontal hopper reinforcement beams secured along the outer perimeter edge of the hopper, and outer vertical support beams extending between the horizontal base structure and the horizontal beams.

Some embodiments provide a method comprising positioning a plurality of portable tunnel structures in a side-by-side configuration, wherein each portable tunnel structure includes a hopper having a rectangular storage area, and wherein the side-by-side configuration of the plurality of portable tunnel structures forms a collective storage area that is the sum of the first rectangular storage areas of each portable tunnel structure. The method further comprises loading the plurality of portable tunnel structures with sand by dropping sand near a central point of the collective storage area until the sand forms a generally conical pile that extends across the plurality of portable tunnel structures. Still further, the method further comprises withdrawing sand through any of the portable tunnel structures by opening a gated chute that empties onto a conveyor that extends from a location below the gated chute within the tunnel to a delivery location outside the tunnel.

DETAILED DESCRIPTION

Figures 1A, 1B:
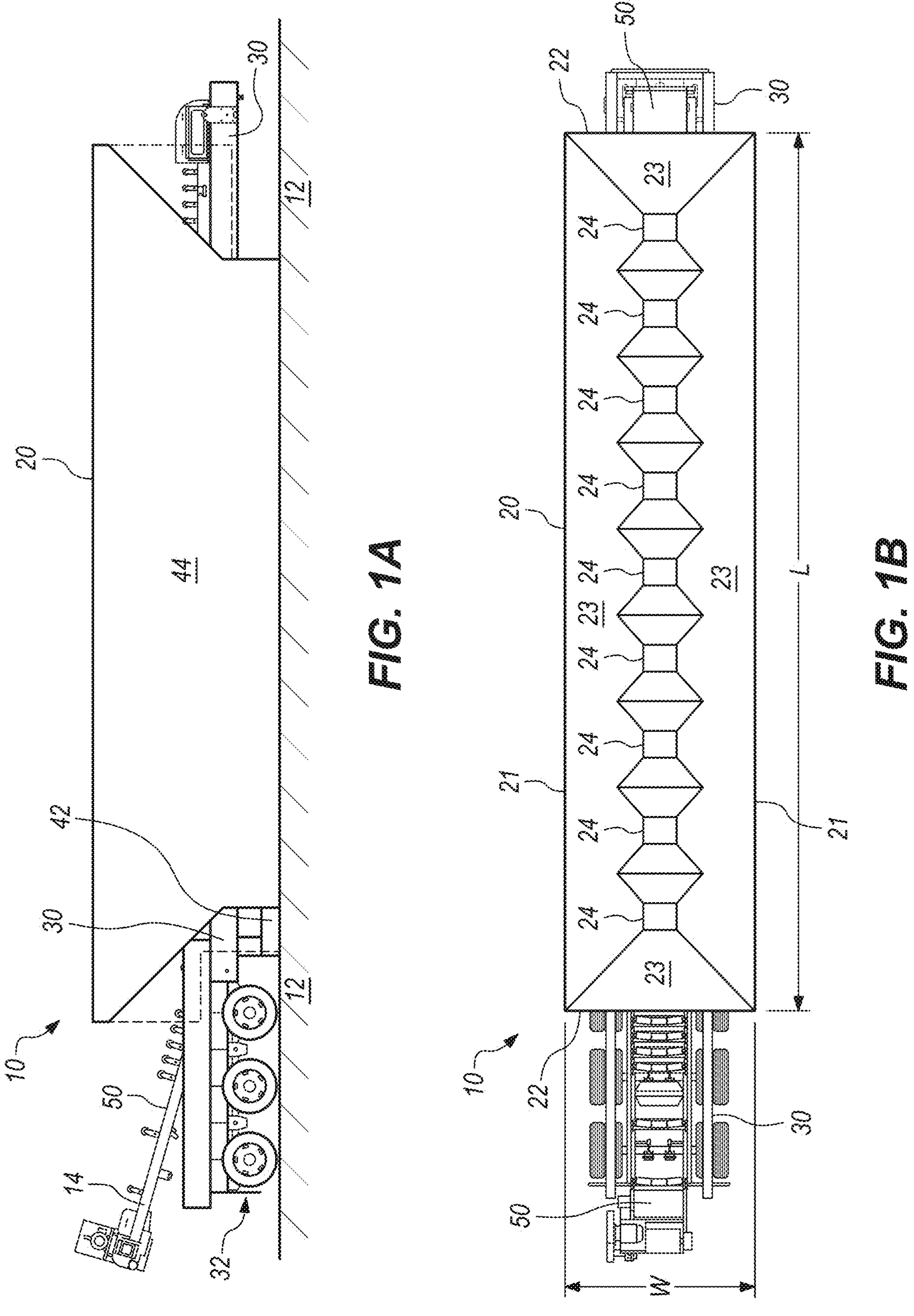
FIG. 1A is a side view of a trailer-mounted portable conveyor tunnel with a rectangular hopper according to some embodiments.
FIG. 1B is a top view of the trailer-mounted portable conveyor tunnel of FIG. 1A.

Some embodiments provide an apparatus comprising a hopper having a perimeter edge and surfaces that are sloped downward and inward to a plurality of hopper outlets, a conveyor system having a conveyor belt disposed below the plurality of hopper outlets, and a support framework including a horizontal base structure for supporting the support framework on a load bearing stratum, horizontal hopper reinforcement beams secured along the outer perimeter edge of the hopper, and outer vertical support beams extending between the horizontal base structure and the horizontal beams. Optionally, the apparatus may be referred to as a portable conveyor tunnel.

The hopper is a container with an open top and sloped sides for storing a flowable particulate material, such as sand. The sloped sides direct the particulate material from the perimeter edge to the plurality of hopper outlets, which are typically located in a central portion of the hopper. For a long rectangular hopper, the hopper outlets may be evenly spaced along the length of the hopper and the sloped sides direct the particulate material to each of the hopper outlets from the adjacent area of the hopper. The slope or angle of the inner surface of the hopper may vary according to the nature of the specific particulate material, but the hopper may have inner surfaces with a downward slope of at least 40 degrees relative to horizontal. Of course, the hopper may also have vertical surfaces. Furthermore, the horizontal hopper reinforcement beams may have a narrow surface that is horizontal around the perimeter edge of the hopper, but such a small area relative to the total area of the hopper will not affect the operation of the hopper. Optionally, the inner surface of the hopper may be lined or coated with an ultra-high molecular weight polyethylene or other low friction and abrasion resistant material.

The conveyor is a mechanical device for moving the particulate material from one location to another. In the present embodiments, the conveyor extends below the plurality of hopper outlets of a given hopper and continues beyond the perimeter edge of the hopper. Accordingly, the conveyor may receive particulate material at any one or more of the hopper outlets and deliver that particulate material to a delivery location beyond the hopper, such as a point at one end of the hopper. For handling particulate material such as sand, the conveyor preferably includes a conveyor belt and troughing rollers for supporting the conveyor belt. The troughing rollers preferably include wing idlers, which may be set at an angle of about 35 degrees.

The support framework is a rigid structure that supports the weight of the hopper, the weight of the particulate material within the hopper, and the additional weight of particulate material that may be piled high above the hopper. Typically, the amount of particulate material that can be piled above a hopper is limited by the storage area of the hopper and an angle of repose for the specific particulate material. However, embodiments of the apparatus may be positioned in a side-by-side configuration to provide a collective storage area that is some multiple of the storage area of an individual hopper. By forming a pile of the particulate material over this larger collective storage area, the particulate material may be piled much higher and exert much greater downward loads on the hopper. Therefore, the support framework provides the strength necessary to support this greater load above the load-bearing stratum, such as soil, without damaging the hopper. By contrast, a typical individual hopper storing the same particulate material does not require such a robust support framework at the perimeter edge of the hopper since only relatively small amounts of particulate material are present near the perimeter due to the sloped surface of the hopper and the particulate material's angle of repose. The amount of strength and stability provided by the present apparatus cannot be achieved with outriggers.

In some embodiments, the support framework further includes inner vertical support beams and sloped hopper reinforcement beams supported by the base structure. Like the outer vertical support beams, the inner vertical support beams are supported by the base structure. The sloped hopper reinforcement beams are secured along the sloped surface of the hopper from the inner vertical support beams to the outer vertical support beams. The combination of the base structure, inner and outer vertical support beams and the sloped hopper reinforcement beams enables the support framework to support substantially greater loads than are normally placed on a hopper.

In some embodiments, a walkway is formed by the support framework. The walkway may extend under the hopper and along the conveyor system. For example, the walkway may be supported on the base structure and may extend between the outer vertical support beams and the inner vertical support beams. Embodiments may repeat the support framework any number of times spaced apart along the length of the hopper. For example, the support framework may be implemented every few feet, such as about every four feet. The support framework may be formed in a lateral plane, but the multiple framework instances are also tied together longitudinally by the base structure and the horizontal hopper reinforcement beams. Additional lateral and/or longitudinal structure may reinforce the multiple instances of the support framework. For example, the support framework may further include conveyor support beams extending between the inner vertical support beams on opposing sides of the conveyor.

The perimeter edge of the hopper may include opposing lateral side edges that define a maximum lateral width of the apparatus. The perimeter edge of the hopper may include the horizontal hopper reinforcement beams, but the apparatus should have a uniform lateral side edge. For example, the perimeter edge of the hopper may have first and second opposing lateral side edges that are both linear and parallel to each other. All components and structure of the apparatus should not extend beyond these lateral side edges in a manner that would obstruct or prevent the apparatus from being positioned in a close side-by-side position with other instances or units of the apparatus. The instances of the apparatus should be able to be positioned as close together as possible, with any gap being minimal and allowing no more than a minor amount of the particulate material to enter any such gap.

In some embodiments, the apparatus may include a wall closing off openings between the outer vertical beams on the lateral sides of the support framework. For example, the wall may be made of sheet metal welded to the outer vertical beams and to the horizontal hopper reinforcement beams. The wall may establish a substantially vertical plane, which would be positioned face to face with the substantially vertical plane of an adjacent instance of the apparatus when they a positioned in a side-by-side configuration to form a collective storage area there above. The wall may enclose the walkways and conveyor and form an enclosed tunnel. Furthermore, if some of the particulate material is able to enter into a gap between two adjacent instances of the apparatus, the walls will form an extremely narrow cavity with negligible capacity. Also, the walls will prevent the particulate material from reaching the walkway and prevent accumulation of the particulate material therein. The walls improve personnel safety within the walkway of the potable conveyor tunnel and minimize the amount of lost or contaminated particulate material that can escape from the pile over the collective storage area.

In some embodiments, a valve or gate is secured to each of the hopper outlets. In one option, the apparatus includes a plurality of gates such as clam shell gates or slide gates, wherein each of the gates is disposed at one of the hopper outlets to controllably release particulate material from the hopper onto the conveyor. Without limitation, the plurality of hopper outlets may include from 4 to 12 hopper outlets, or preferably from 6 to 10 hopper outlets.

In some embodiments, the hopper, the conveyor system, and the support framework may be integrated together as a skid. Accordingly, the apparatus may be a stand-alone apparatus that does not include a trailer. A skid may be moved with a crane or pulled across the ground with various vehicles to position the skid into a side-by-side configuration forming the collective storage area.

In some embodiments, the apparatus may include a trailer including a trailer chassis, wherein the support framework is secured to or integrated with the trailer chassis. For example, the trailer chassis may be lowered so that the support framework rests on the load bearing stratum. The trailer chassis may be lowered with retractable wheels or a mechanism like a winch trailer or a frac tank. Optionally, the trailer may be a drop bottom trailer. In one option, the support framework may be secured to the trailer chassis so that the lower side of the support framework and the trailer chassis are at the same elevation, and both form a part of the base structure. In another option, the support framework extends below the trailer chassis and forms a base structure that is below the trailer chassis and extends laterally beyond the trailer chassis. In the latter option, the perimeter edge of the hopper may have lateral side edges that are positioned laterally beyond the trailer chassis, which provides an individual instance of the apparatus with a larger rectangular storage area.

Some embodiments provide a system comprising a plurality of portable tunnel structures positioned in a side-by-side configuration with no more than a minimal gap between adjacent portable tunnel structures. Each portable tunnel structure includes a hopper having a rectangular storage area, wherein the side-by-side configuration of the plurality of portable tunnel structures forms a collective storage area that is the sum of the rectangular storage areas of each portable tunnel structure. Each portable tunnel structure further includes a perimeter edge and surfaces that are sloped downward and inward to a plurality of hopper outlets, a conveyor system having a conveyor belt disposed below the plurality of hopper outlets, and a support framework. The support framework includes a horizontal base structure having flat surfaces for supporting the support framework on a load bearing stratum, horizontal hopper reinforcement beams secured along the outer perimeter edge of the hopper, and outer vertical support beams extending between the horizontal base structure and the horizontal beams.

The portable tunnel structures are preferably positioned in the side-by-side configuration as close as is practical. For example, the size of any gap between two adjacent portable tunnel structures may be affected by (1) the extent to which the load bearing stratum is level and firm, (2) the ability and effort of an operator to position one portable tunnel structure next to another portable tunnel structure using available equipment, and (3) the extent to which the sides of the portable tunnel structures are uniformly linear. Accordingly, in any particular well site location, there may be small unintentional gaps between adjacent portable tunnel structures, yet these portable tunnel structures may be said to be as close as is practical or essentially without a gap therebetween. Still, embodiments of the portable tunnel structure should have a construction that does not inherently introduce gaps of any operational significance.

Some embodiments of the system may further include a portable radial stacking conveyor positioned to dump sand in a central point of the collective storage area. Specifically, the portable radial stacking conveyor may elevation sand from a point near the ground to a point high above the portable tunnel structures where the sand is released and allowed to drop into the collective storage area formed my multiple instances of the portable tunnel structure in a close side-by-side configuration. The portable radial stacking conveyor may have an adjustable height but should be able to elevate the particulate material to a height that a pile of the particulate material will not reach (without spilling out of the collective storage area) given the height of the hoppers, the size and shape of the collective storage area, and the angle of repose for the particulate material.

In various embodiments, the system may include a portable tunnel structure or apparatus according to any one or more embodiments disclosed herein. Furthermore, the system may include additional equipment, such as one or more truck-unloading road portable conveyors arranged to receive particulate material from a truck and deliver the particulate material to the road portable radial stacking conveyor. In one option, the additional equipment may include a cross over conveyor extending along the delivery locations of each tunnel conveyor and a blender feed conveyor to support, for example, a hydraulic fracturing operation.

Some embodiments provide a method comprising positioning a plurality of portable tunnel structures in a side-by-side configuration, wherein each portable tunnel structure includes a hopper having a rectangular storage area, and wherein the side-by-side configuration of the plurality of portable tunnel structures forms a collective storage area that is the sum of the first rectangular storage areas of each portable tunnel structure. The method further comprises loading the plurality of portable tunnel structures with sand by dropping sand near a central point of the collective storage area until the sand forms a generally conical pile that extends across the plurality of portable tunnel structures. Still further, the method further comprises withdrawing sand through any of the portable tunnel structures by opening a gated chute that empties onto a conveyor that extends from a location below the gated chute within the tunnel to a delivery location outside the tunnel.

The rectangular storage area of each of the plurality of portable tunnel structures has a length and a width. The plurality of portable tunnel structures may include any number of the portable tunnel structures so that, with each of the portable tunnel structures positioned in the side-by-side configuration, the total width of the plurality of portable tunnel structures is approximately the same as the length of each portable tunnel structure. Optionally, the number of portable tunnel structures may be such that the total width of the plurality of portable tunnel structures is greater than or less than the length of each portable tunnel structure.

In some embodiments, the collective storage area may be able to store and support over 1,000 tons of sand when piled with a natural angle of repose for sand. For example, the hopper of a single portable tunnel structure may have a length of about 54 feet and a width of about 12 feet. Accordingly, positioning five of these portable tunnel structures in a close side-by-side configuration will form a collective storage area that is 54 feet long (i.e., the length of each of the five hoppers) and about 60 feet wide (i.e., 5 times the individual width of about 12 feet). Optionally, the particulate material may be sand, such as dry sand or wet sand.

In some embodiments, the method may include the use of any of the embodiments of the portable tunnel structure and/or any of the additional equipment disclosed in reference to the system. For example, the sand may be dropped near the central point of the collective storage area using a road portable radial stacking conveyor. Furthermore, the method may include positioning an additional conveyor along an end of the plurality of portable tunnel structures to extend under the delivery location of each portable tunnel structure.

Some embodiments of the well site storage system provide the technical benefit of preventing contamination of the sand. The hoppers support the sand above the ground (load bearing stratum) to prevent the sand from making contact with the contaminants.

Some embodiments of the well site storage system provide the technical benefit of increasing the particulate storage capacity, especially the particulate storage capacity for a given number of hoppers. For example, some embodiments may have the capacity to store enough sand for one fracturing stage using only a few of the portable tunnel structures, such as five portable tunnel structures. Furthermore, the particulate storage capacity may be easily modified by simply adding or subtracting one or more portable tunnel structure to or from the side-by-side configuration to cause a corresponding change in the size of the pile that can be retained in the collective storage area.

Embodiments of the well site storage system provide the technical benefit of establishing conveyor tunnels with walkways that are safely accessible to personnel due to the support framework that reinforces the hopper. Accordingly, any malfunctioning of the conveyor, gates or various sensors and other equipment within the tunnel may be serviced without interrupting the operation of other adjacent portable tunnel structures.

FIG. 1A is a side view of a trailer-mounted portable conveyor tunnel 10 with a rectangular hopper 20 according to some embodiments. The hopper 20 is supported by a support framework (not shown) that is secured to the trailer 30. The support framework includes a base structure 42 (only partially shown) that rests on the load bearing stratum 12. As shown here, the wheels 32 of the trailer 30 have been retracted and/or the support framework has been lowered. A wall 44 covers the side of the support framework. One end of a conveyor 50 is shown extending from inside the tunnel to a delivery location 14.

FIG. 1B is a top view of the trailer-mounted portable conveyor tunnel 10 of FIG. 1A. The hopper 20 has a rectangular storage area marked by a length ("L") and a width ("W"). The perimeter of the rectangular storage area includes two side edges 21 and two end edges 22. Note that the two side edges 21 are linear and parallel to each other. The hopper has sloped surfaces 23 that slope downward from the perimeter edges 21, 22 to a plurality of hopper outlets or chutes 24. The hooper outlets 24 are located directly above the conveyor 50 and direct particulate material that is the hopper onto the conveyor 50. The amount and timing of particulate material released onto the conveyor is preferably controlled by the gates (not shown), such as a clam shell gate, associated with each hopper outlet 24.

Figures 2A, 2B:
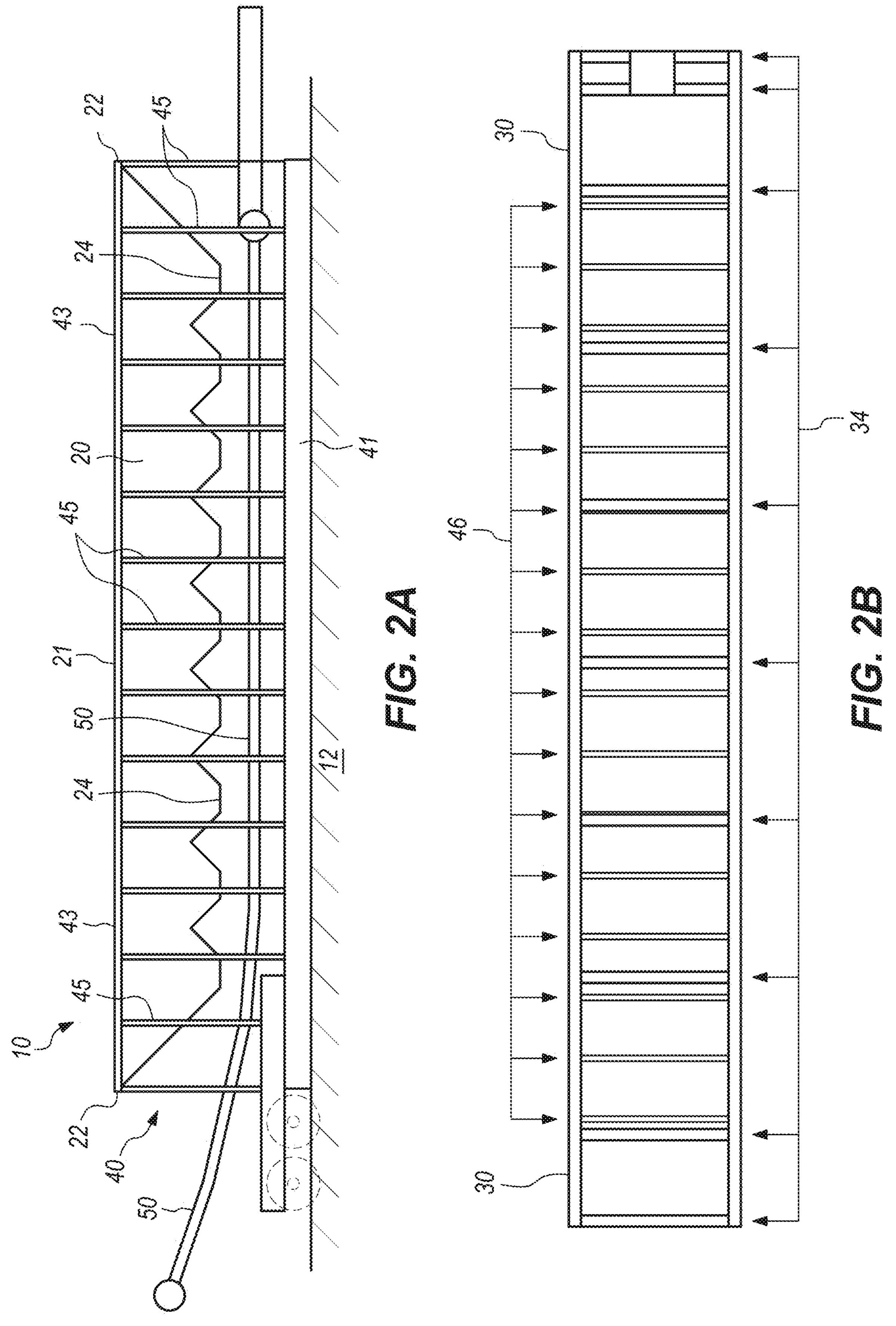
FIG. 2A is a schematic side view of a trailer-mounted portable conveyor tunnel with a rectangular hopper supported by a structural framework according to some embodiments.
FIG. 2B is a schematic plan view of the trailer chassis of FIG. 2A illustrating cross supports that are part of an original trailer chassis and additional cross supports that form part of the structural framework that supports the rectangular hopper.

FIG. 2A is a schematic side view of the trailer-mounted portable conveyor tunnel 10 with the rectangular hopper 20 supported by a support framework 40 according to some embodiments. The support framework 40 includes a horizontal base structure 41 for supporting the support framework on the load bearing stratum 12, horizontal hopper reinforcement beams 43 (on both sides 21 and both ends 22) secured along the outer perimeter edge of the hopper 20, and outer vertical support beams 45 (15 shown) extending between the horizontal base structure 41 and the horizontal hopper reinforcement beams 43. This structure reinforces the hopper 20 all the way to the edges 21, 22 with beams that transfer the load to the load bearing stratum 12. In this view, the conveyor 50 is shown extending under each of the hopper outlets 24.

FIG. 2B is a schematic plan view of the trailer chassis 30 of FIG. 2A illustrating cross supports 34 (10 shown) that are part of an original trailer chassis 30. Additional cross supports 46 (16 shown) that form part of the support framework 40, such as the base structure 42, that supports the rectangular hopper.

Figure 3A:
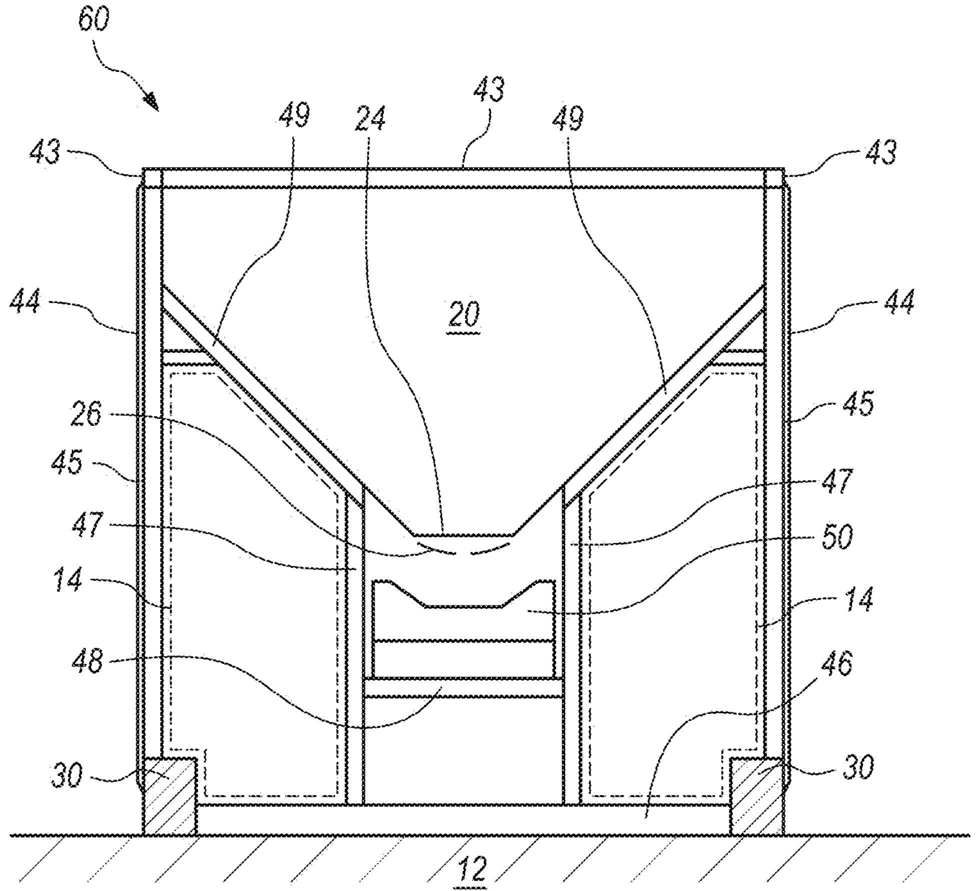
FIG. 3A is an end view of a single support frame for supporting the hopper and the conveyor while forming a pair of walkways through the tunnel according to one embodiment.

FIG. 3A is an end view of a single support frame 60 for supporting the hopper 20 and the conveyor 50 while forming a pair of walkways 14 (see dashed outline) through the tunnel that is created under the hopper 20 according to one embodiment. The support frame 60 includes the horizontal base structure 46 for supporting the support framework on a load bearing stratum 12, where the base structure 46 may include both the horizontal beam 46 and the trailer chassis 30. The support frame 60 further includes the horizontal hopper reinforcement beams 43 secured along the outer perimeter edges 21, 22 (see FIG. 1B) of the hopper 20 and the outer vertical support beams 45 extending between the horizontal base structure 46, which includes longitudinal beams 30, and the horizontal hopper reinforcement beams 43.

The support frame 60 further includes inner vertical support beams 47 supported by the horizontal base structure 46, and the sloped hopper reinforcement beams 49 secured along the sloped surface of the hopper 20 from the inner vertical support beams 47 to the outer vertical support beams 45. The support frame 60 supports the increased loads associated with a pile of particulate material that extends over the collective storage area of multiple hoppers. The support frame 60 also provides the pair of walkways 14 extending under the hopper 20 and along the conveyor system 50. A walkway surface may be supported on the base structure 46 and may extend between the outer vertical support beams 45 and the inner vertical support beams 47. Still further, the support frame 60 may include a conveyor support beam 48 extending between the inner vertical support beams 47 and the wall 44 that closes off openings between the outer vertical beams 45 on the lateral sides of the support framework (see FIG. 1A). The hopper 20 includes the hopper outlet 24 and a clam shell gate 26 is shown secured across the hopper outlet 24 for selectively releasing particulate material form the hopper 20 on the conveyor 50.

Figure 3B:
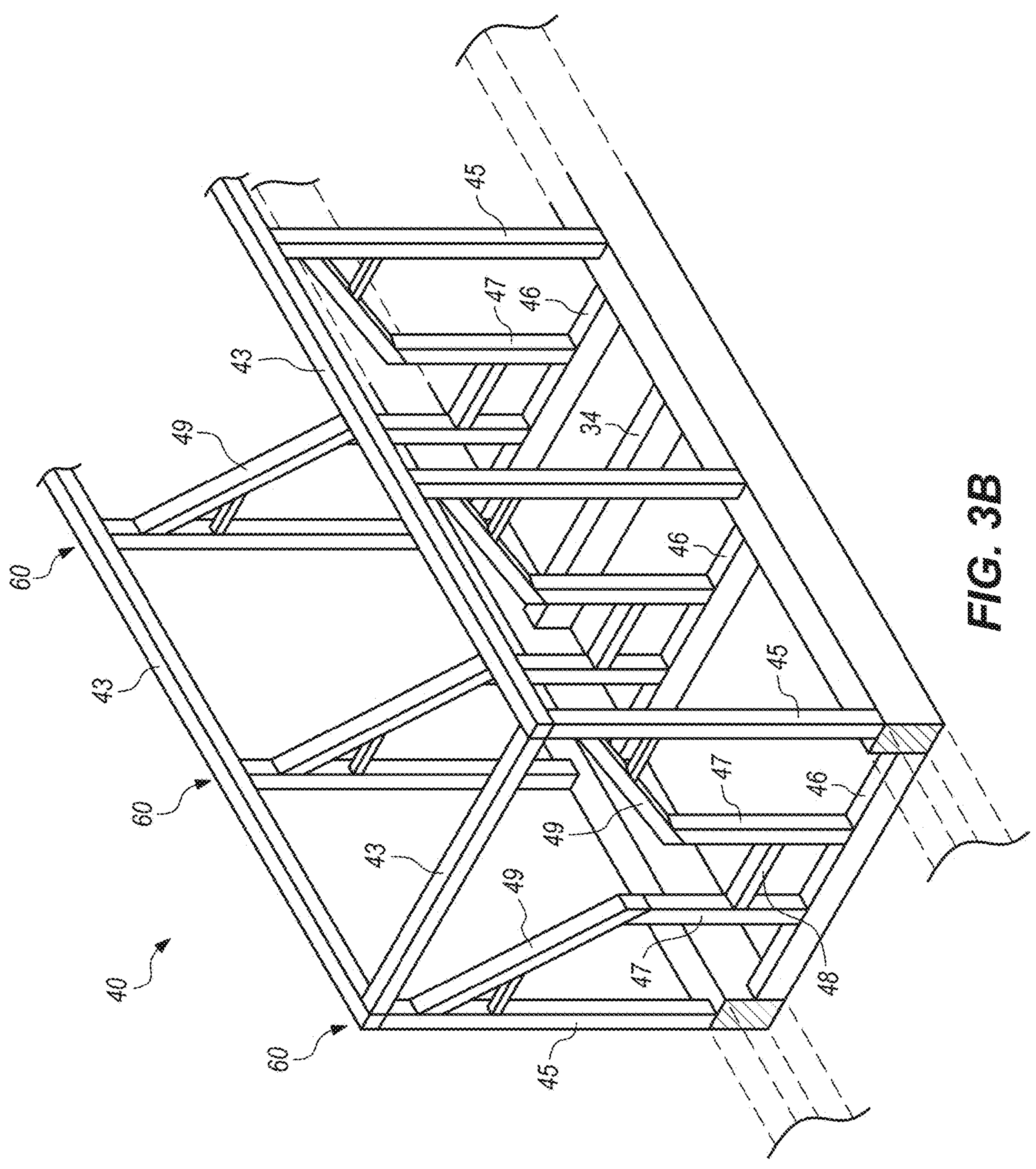
FIG. 3B is a perspective view of three support frames integrated to form one end of the support framework formed on a trailer chassis.

FIG. 3B is a perspective view of three of the support frames 60 (see FIG. 3A) integrated together to form one end of the support framework 40 for a portable conveyor tunnel 10 (see FIGS. 1A-B and 2A). The hopper, conveyor, clam shell gates, and side walls are not shown in FIG. 3B in order to emphasize the structure of the support framework 40.

The support frames 60 are spaced along the length of the hopper 20 (see outer vertical support beams 45 in FIG. 2A), preferably with uniform spacing such as about 4 feet (see cross supports 46 in FIG. 2B). The series of support frames 60 are tied together to form the support framework 40 (see FIG. 2A, where the support frames extend into the page behind the outer vertical support beams 45). For example, the support frames 60 may be tied together by a common base structure extending the length of the hopper (see longitudinal beams 30, cross supports 34, and cross supports 46; also shown in FIG. 2B) and the horizontal hopper reinforcement beams 43 along the perimeter edges. In fact, the hopper 20 itself may serve to tie together the support frames 60.

The base structure may include the longitudinal beams 30 and the cross supports 34, 46 Furthermore, the base structure for the entire support framework 40 may form a skid. A skid is a system or set of equipment contained within a frame that allows the system to be easily transported from one location to another. Accordingly, the hopper, the conveyor system and the tunnel formed by the support framework 40 may be integrated together as a skid. The skid may be transported on a trailer, but typically does not include the trailer. Rather, the skid is set off the trailer after arriving at a well site.

In some embodiments, the longitudinal beams 30 may be part of a trailer chassis that has been secured to the support framework or integrated into the support framework. The trailer chassis preferably can be lowered so that the support framework rests on a surface of the load bearing stratum.

Figure 4:
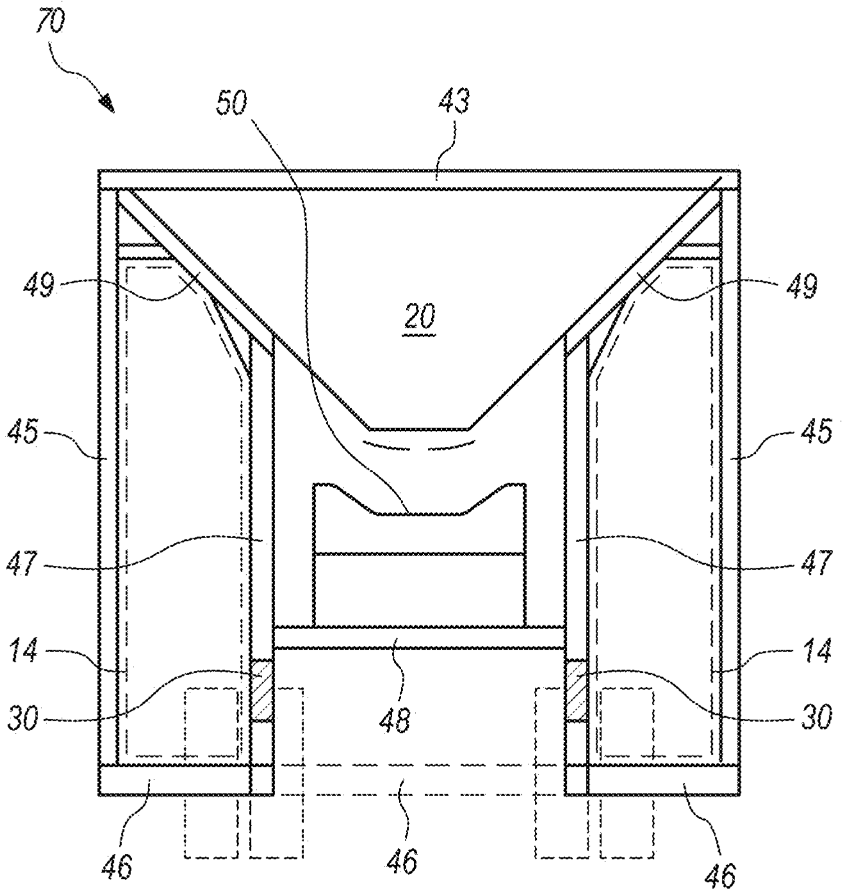
FIG. 4 is an end view of a single support frame for supporting the hopper and the conveyor while forming a pair of walkways through the tunnel according to another embodiment.

FIG. 4 is an end view of a single support frame 70 for supporting the hopper 20 and the conveyor 50 while forming a pair of walkways 14 through the tunnel according to another embodiment. The support frame 70 may include essentially the same structural members but extends below the longitudinal beams 30 of a trailer chassis and extends laterally beyond the trailer chassis and wheels. Accordingly, the support frame 70 will support a hopper 20 with a greater rectangular storage area than the support frame 60 in FIG. 3A. However, the support frame 70 may be implemented into a support framework 40 in the same manner as the support frame 60.

Figure 5:
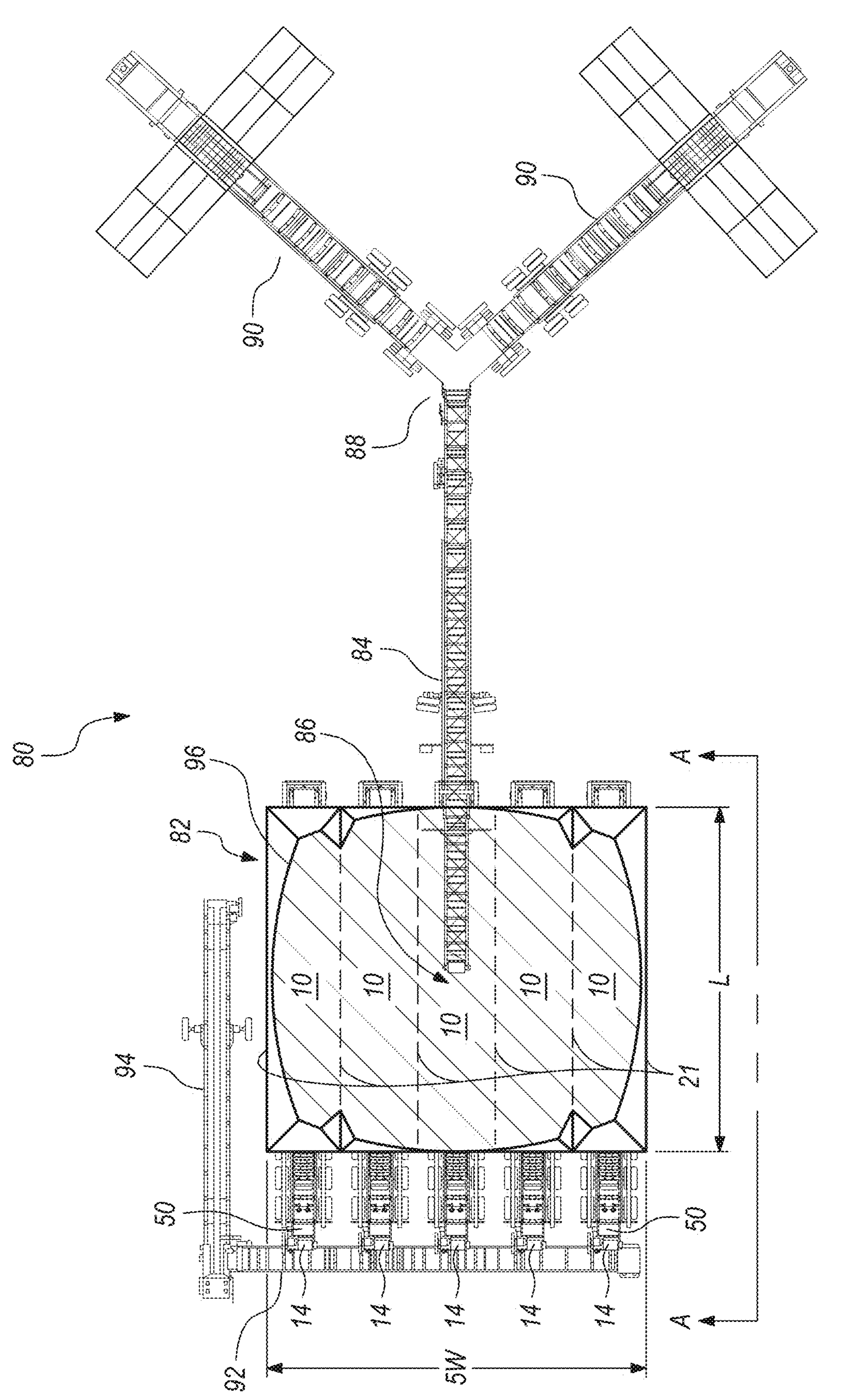
FIG. 5 is a plan view of a well site sand storage and handling system including a plurality of the trailer-mounted portable conveyor tunnels with hoppers positioned in a side-by-side configuration forming a collective storage area that can store more sand than the same number of the same size of individual hoppers.

FIG. 5 is a plan view of a well site sand storage and handling system 80 including a plurality of the trailer-mounted portable conveyor tunnels 10 (5 instances shown) with hoppers positioned in a side-by-side configuration forming a collective storage area 82 having a length ("L") and a width ("5W") that is capable of storing more sand than the same number (5 instances) of the same size (L×W) of individual hoppers.

The system 80 may further include a portable radial stacking conveyor 84 positioned to dump sand in a central point 86 of the collective storage area 82. Specifically, the portable radial stacking conveyor 84 may elevation sand from a point 88 near the ground to a point 86 high above the portable tunnel structures 10 where the sand is released and allowed to drop into the collective storage area 82 formed my multiple instances of the portable tunnel structure in a close side-by-side configuration. The portable radial stacking conveyor 84 may have an adjustable height but should be able to elevate the particulate material to a height that a pile 96 (the cross-hatched area) of the particulate material will not reach (without spilling out of the collective storage area) given the height of the hoppers, the size and shape of the collective storage area, and the angle of repose for the particulate material (see also FIG. 6).

The system 80 may further include additional equipment, such as one or more truck unloading road portable conveyors 90 arranged to receive particulate material from a truck and deliver the particulate material to the point 88 of road portable radial stacking conveyor 84. In one option, the additional equipment may include a crossover conveyor 92 extending along the delivery locations 14 of each tunnel conveyor 50 and a blender feed conveyor 94 to support, for example, a hydraulic fracturing operation.

Figure 6A:
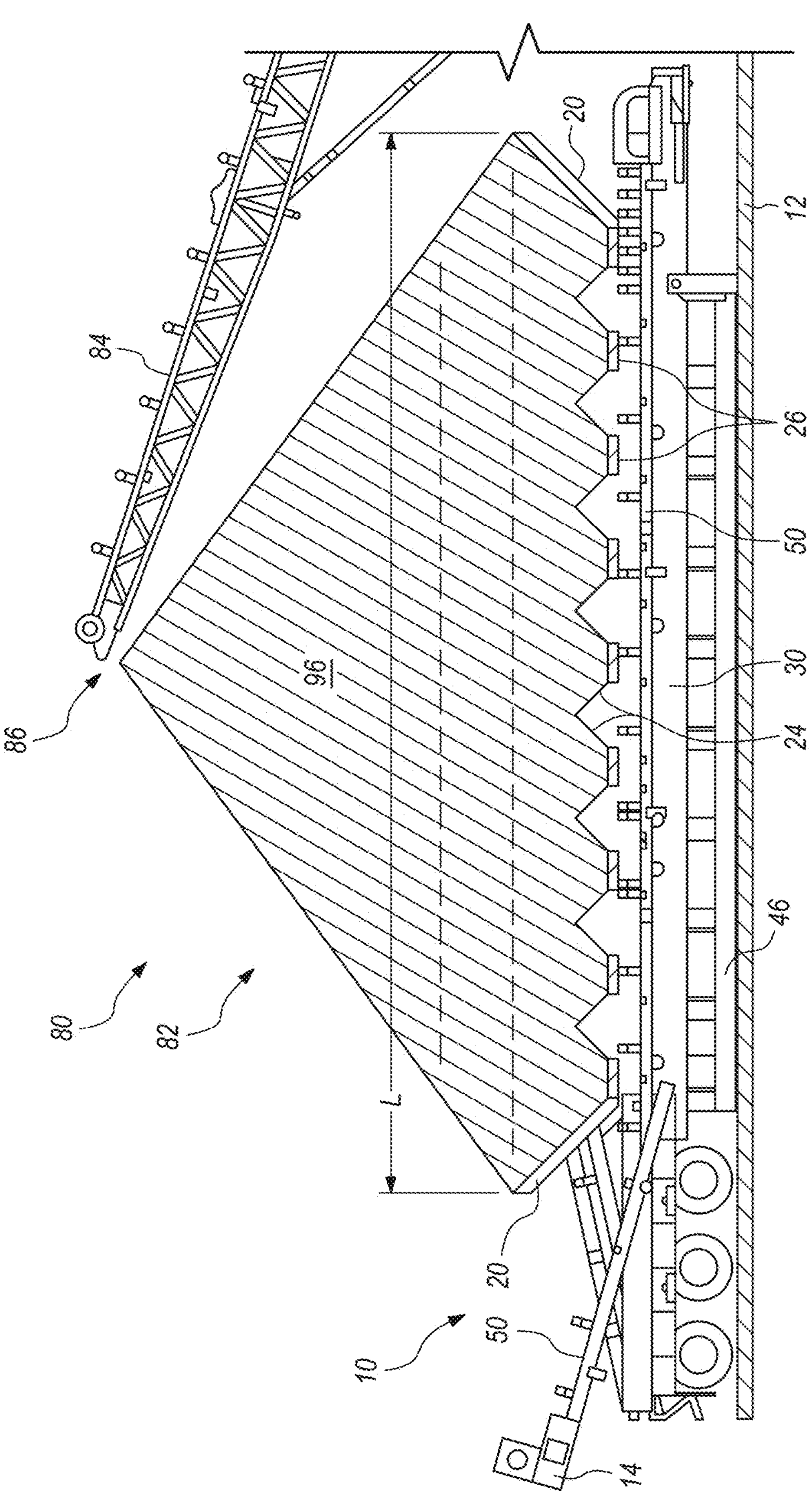
FIG. 6A is a schematic side view of the well site sand storage as viewed from line A-A in FIG. 5 illustrating the substantial increase in sand storage made possible by the collective storage area.

FIG. 6A is a schematic side view of a portion of the well site sand storage system 80 as viewed from line A-A in FIG. 5 illustrating the substantial increase in sand storage made possible by the collective storage area 82. Specifically, it is the increased width of the collective storage area 82, which is here five times wider than a single portable tunnel structure 10 (see "5W" in FIG. 5), and the support framework 40 that provides greater support to the hopper of each portable tunnel structure 10 that allows the pile 96 to rise much higher than any pile in a single one of the hoppers. This additional storage capacity is accomplished with fewer hoppers than using traditional single hoppers, while providing conveyors 50 that provide easy and rapid access to the particulate material. Still further, the tunnel areas and walkways (see FIGS. 3A and 4) allow personnel to safely access any area under the collective storage area 82 to maintain the conveyors, gates, and electronic sensors, motors and actuators (not shown) that are used to operate and monitor the conveyors and the gates.

Figure 6B:
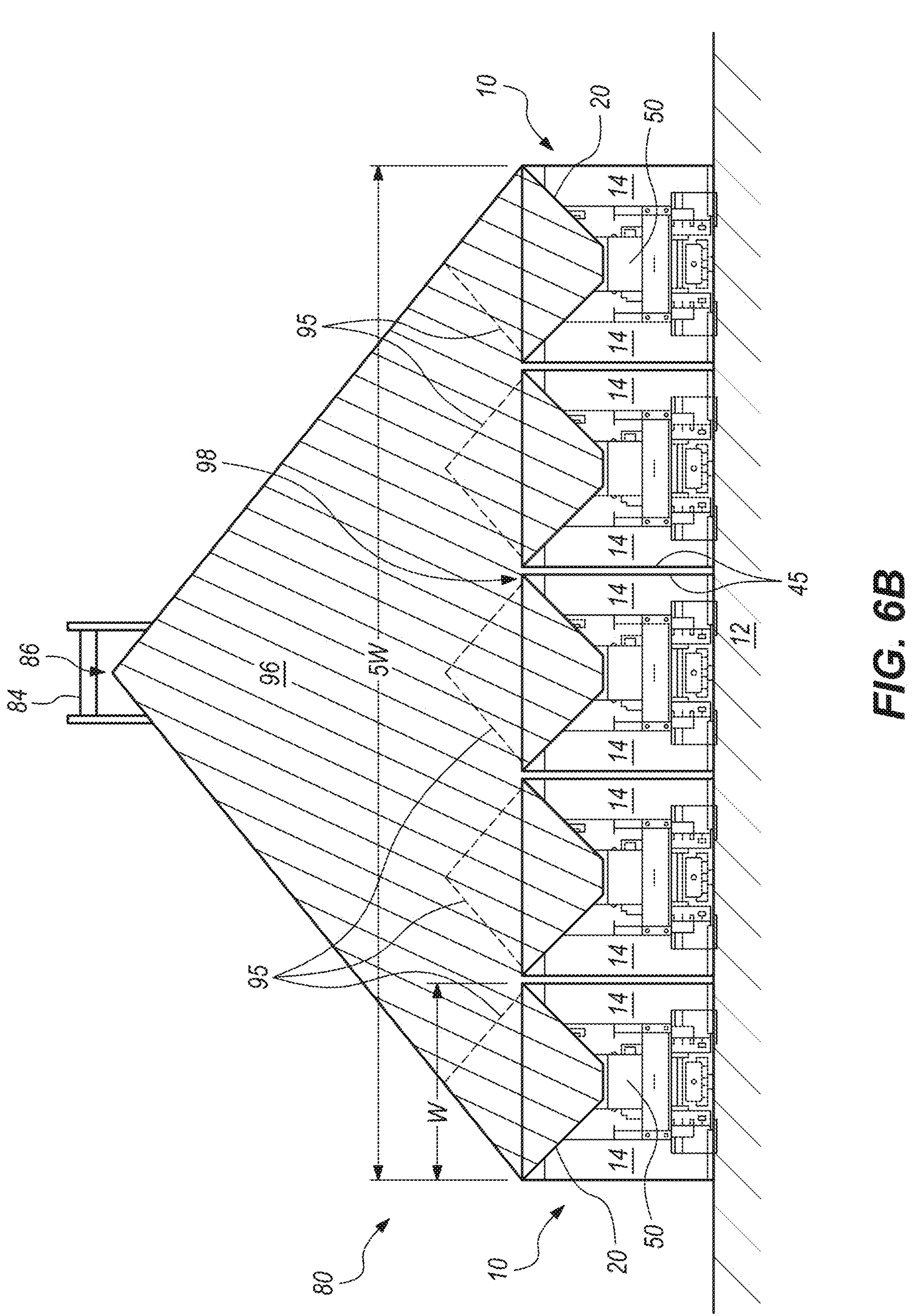
FIG. 6B is a schematic end view of the well site sand storage as viewed from line B-B in FIG. 5 illustrating the substantial increase in sand storage made possible by the collective storage area.

FIG. 6B is a schematic end view of the well site sand storage system 80 as viewed from line B-B in FIG. 5 illustrating the substantial increase in sand storage made possible by the collective storage area 82 (See FIG. 5). Specifically, the system 80 includes five portable tunnel structures 10 in a close side-by-side configuration to from the collective storage area 82 having a width ("5W") that is five times wider than the width ("W") a single portable tunnel structure 10. The support framework 40 of each portable tunnel structure 10 provides the greater amount of support to the hoppers 20 of each portable tunnel structure 10 that allows the pile 96 to rise much higher than any pile (illustrated in dashed lines 95) that could be contained in and supported by the individual hoppers. This additional storage capacity is accomplished with fewer hoppers than using traditional single hoppers, while providing conveyors 50 that provide easy and rapid access to the particulate material. Still further, the tunnel areas and walkways Specifically, it is the increased width of the collective storage area 82, which is here five times wider than a single portable tunnel structure 10 (see "5W" in FIG. 5), and the support framework 40 that provides greater support to the hopper of each portable tunnel structure 10 that allows the pile 96 to rise much higher than any pile in a single one of the hoppers. This additional storage capacity is accomplished with fewer hoppers than using traditional single hoppers, while providing conveyors 50 that provide easy and rapid access to the particulate material. Still further, the tunnel areas and walkways 14 (see FIGS. 3A and 4) allow personnel to safely access any area under the collective storage area 82 to maintain the conveyors, gates, and electronic sensors, motors and actuators (not shown) that are used to operate and monitor the conveyors and the gates. Any minor gap 98 that may exist between the walls 45 of any two adjacent portable tunnel structures 10 may become filled with the particulate material but cannot accumulate in the walkways 14 as a result of the walls 45.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An apparatus, comprising:

a hopper having an open top, a perimeter edge and surfaces that are sloped downward and inward to a plurality of hopper outlets;

a conveyor system having a conveyor belt disposed below the plurality of hopper outlets;

a support framework including a horizontal base structure for supporting the support framework on a load bearing stratum, horizontal hopper reinforcement beams secured along the outer perimeter edge of the hopper, and outer vertical support beams extending between the horizontal base structure and the horizontal beams; and a wall closing off openings between the outer vertical beams on lateral sides of the support framework.

2. The apparatus of claim 1, wherein the wall establishes a substantially vertical plane.

3. The apparatus of claim 1, wherein the plurality of hopper outlets includes from 4 to 12 hopper outlets.

4. The apparatus of claim 1, wherein the perimeter edge of the hopper includes opposing lateral side edges that define a maximum lateral width of the apparatus.

5. The apparatus of claim 1, wherein the perimeter edge of the hopper includes first and second opposing lateral side edges that are both linear and parallel to each other.

6. The apparatus of claim 1, characterized in that the structural framework is supportable from the load bearing stratum without using outriggers.

7. The apparatus of claim 1, further comprising:

a gate secured to the hopper outlet.

8. The apparatus of claim 1, wherein the hopper, the conveyor system and the support framework are integrated together as a skid.

9. The apparatus of claim 1, further comprising:

a plurality of gates, wherein each of the gates is disposed at one of the hopper outlets to controllably release sand from the hopper onto the conveyor, and wherein each gate is selected from a clam shell gate and a slide gate.

10. An apparatus, comprising:

a hopper having an open top, a perimeter edge and surfaces that are sloped downward and inward to a plurality of hopper outlets;

a conveyor system having a conveyor belt disposed below the plurality of hopper outlets; and a support framework including a horizontal base structure for supporting the support framework on a load bearing stratum, horizontal hopper reinforcement beams secured along the outer perimeter edge of the hopper, and outer vertical support beams extending between the horizontal base structure and the horizontal beams, wherein the support framework further includes inner vertical support beams and sloped hopper reinforcement beams supported by the base structure, wherein the inner vertical support beams are supported by the horizontal base structure, and wherein the sloped hopper reinforcement beams are secured along the sloped surface of the hopper from the inner vertical support beams to the outer vertical support beams.

11. The apparatus of claim 10, further comprising:

a walkway extending under the hopper and along the conveyor system, wherein the walkway is supported on the base structure and extends between the outer vertical support beams and the inner vertical support beams.

12. An apparatus, comprising:

a hopper having an open top, a perimeter edge and surfaces that are sloped downward and inward to a plurality of hopper outlets;

a conveyor system having a conveyor belt disposed below the plurality of hopper outlets; and a support framework including a horizontal base structure for supporting the support framework on a load bearing stratum, horizontal hopper reinforcement beams secured along the outer perimeter edge of the hopper, and outer vertical support beams extending between the horizontal base structure and the horizontal beams; and a trailer including a trailer chassis, wherein the support framework is secured to the trailer chassis, and wherein the trailer chassis can be lowered so that the support framework rests on a surface of a load bearing strata.

13. The apparatus of claim 12, wherein the base structure extends below the trailer chassis and laterally beyond the trailer chassis, and wherein the perimeter edge of the hopper includes lateral side edges that are positioned laterally beyond the trailer chassis.

14. A system comprising:

a plurality of portable tunnel structures positioned in a side-by-side configuration with no more than a minimal gap between adjacent portable tunnel structures, wherein each portable tunnel structure includes a hopper having a rectangular storage area, wherein the side-by-side configuration of the plurality of portable tunnel structures forms a collective storage area that is the sum of the rectangular storage areas of each portable tunnel structure, wherein each portable tunnel structure further includes an open top, a perimeter edge and surfaces that are sloped downward and inward to a plurality of hopper outlets, a conveyor system having a conveyor belt disposed below the plurality of hopper outlets, and a support framework, and wherein the support framework includes a horizontal base structure for supporting the support framework on a load bearing stratum, horizontal hopper reinforcement beams secured along the outer perimeter edge of the hopper, and outer vertical support beams extending between the horizontal base structure and the horizontal beams;

a portable radial stacking conveyor positioned to dump sand in a central point of the collective storage area;

one or more truck-unloading road portable conveyors arranged to receive sand from a truck and deliver the sand to the road portable radial stacking conveyor;

a crossover conveyor extending along delivery locations of each conveyor system; and a blender feed conveyor at the end of the crossover conveyor for supporting a hydraulic fracturing operation.

15. A system comprising:

a plurality of portable tunnel structures positioned in a side-by-side configuration with no more than a minimal gap between adjacent portable tunnel structures, wherein each portable tunnel structure includes a hopper having a rectangular storage area, and wherein the side-by-side configuration of the plurality of portable tunnel structures forms a collective storage area that is the sum of the rectangular storage areas of each portable tunnel structure;

wherein each portable tunnel structure further includes an open top, a perimeter edge and surfaces that are sloped downward and inward to a plurality of hopper outlets, a conveyor system having a conveyor belt disposed below the plurality of hopper outlets, and a support framework, wherein the support framework includes a horizontal base structure for supporting the support framework on a load bearing stratum, horizontal hopper reinforcement beams secured along the outer perimeter edge of the hopper, and outer vertical support beams extending between the horizontal base structure and the horizontal beams, wherein, for each of the portable tunnel structures, the support framework further includes inner vertical support beams and sloped hopper reinforcement beams supported by the base structure, wherein the inner vertical support beams are supported by the horizontal base structure, and wherein the sloped hopper reinforcement beams are secured along the sloped surface of the hopper from the inner vertical support beams to the outer vertical support beams.

16. The system of claim 15, wherein each portable tunnel structure includes a walkway extending under the hopper and along the conveyor system, and wherein, for each portable tunnel structure, the walkway is supported on the base structure and extends between the outer vertical support beams and the inner vertical support beams.

* * * * *